P. PROBSTEL.
PERMUTATION VALVE.
APPLICATION FILED DEC. 13, 1921.
1,412,134. Patented Apr. 11, 1922.
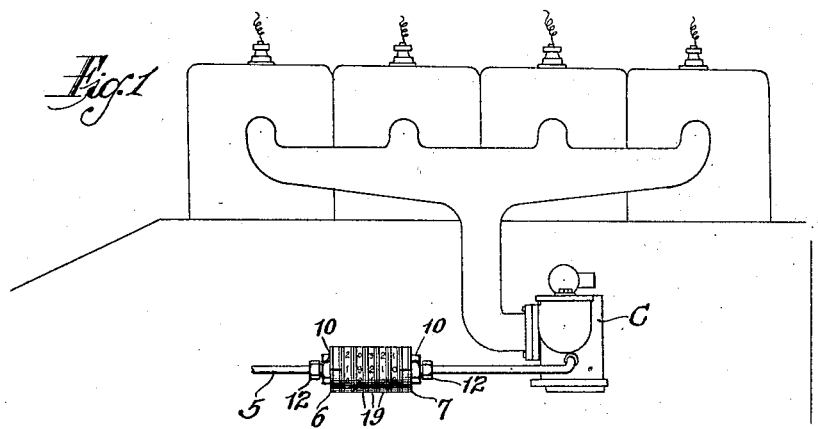
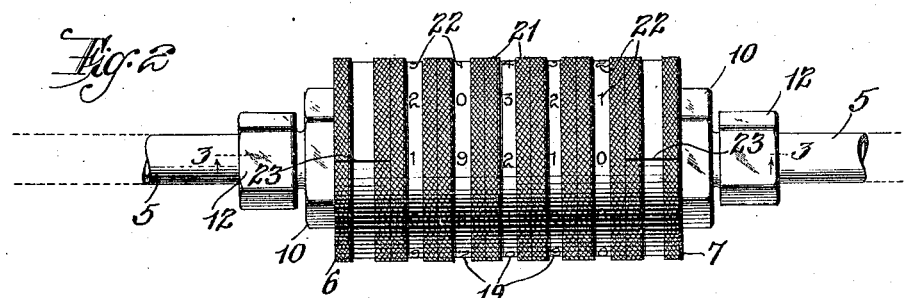
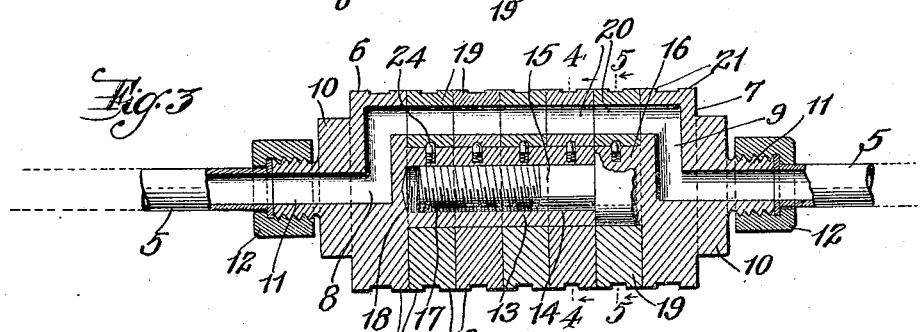
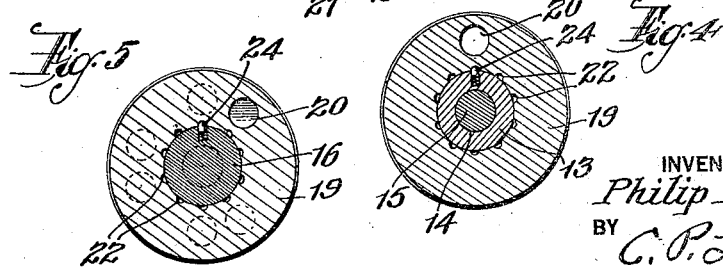
INVENTOR
Philip Probstel,
BY
ATTORNEY

UNITED STATES PATENT OFFICE.

PHILIP PROBSTEL, OF BROOKLYN, NEW YORK, ASSIGNOR OF ONE-HALF TO CHARLES B. SILVERBERG, OF CALDWELL, NEW JERSEY.

PERMUTATION VALVE.

1,412,134.  Specification of Letters Patent.  Patented Apr. 11, 1922.

Application filed December 13, 1921. Serial No. 522,062.

*To all whom it may concern:*

Be it known that I, PHILIP PROBSTEL, a citizen of the Republic of Germany, and a resident of Brooklyn, county of Queens, and State of New York, have invented certain new and useful Improvements in Permutation Valves, of which the following is a specification.

This invention relates to permutation valves and has for its primary object to provide a valve of this character which is particularly designed for use in connection with the gasoline or other fuel supply pipe or conduit of a motor-driven vehicle, whereby the supply of the motor fuel through said conduit may be cut off and the valve locked so that such supply cannot be re-established except by one having knowledge of the combination whereby the permutation valve elements may be properly operated to open the valve.

In one embodiment of my invention, the valve includes inlet and outlet heads suitably coupled or connected to the opposed ends of the pipe or conduit sections. These heads are provided with means whereby they may be detachably connected to each other, each head having a port or passage therein. Upon the connecting means between the heads a series of relatively rotatable permutation disks are mounted, each disk having an opening therein, said openings being adapted to be brought into alignment with each other and with the ports in said heads when the disks are rotated to certain definite predetermined positions. One of the important objects of this construction is to so connect the inlet and outlet heads and arrange the disks or permutation elements therebetween that the connecting means is entirely concealed so that one unfamiliar with the mechanism of the valve cannot ascertain how the parts are connected.

It is a further general object of the invention to provide a valve as above characterized which consists of relatively few parts of simple construction, is not liable to get out of order, and is highly efficient for the purpose in view.

With the above and other objects in view, the invention consists in the improved permutation valve and in the form, construction and relative arrangement of its several parts as will be hereinafter more fully described, illustrated in the accompanying drawings and subsequently incorporated in the subjoined claims.

In the drawings, wherein I have disclosed one practical and satisfactory embodiment of the invention and in which similar reference characters designate corresponding parts throughout the several views:

Fig. 1 is a view showing the application of my improved permutation valve for use in connection with the fuel supply pipe of a gasoline motor;

Fig. 2 is an enlarged elevation of the valve;

Fig. 3 is a longitudinal section through the valve, taken on the line 3—3 of Fig. 2;

Fig. 4 is a transverse section, taken on the line 4—4 of Fig. 3; and

Fig. 5 is a similar section, taken on the line 5—5 of Fig. 3, the permutation elements having been shifted from the positions seen in Fig. 3 to lock the valve.

For purposes of illustration I have shown my improved valve interposed in the fuel supply pipe 5 leading from the tank or reservoir to the carbureter C of a gasoline engine such as is commonly used in connection with motor-driven vehicles. The valve includes an inlet head 6 and an outlet head 7, said heads each having an angular port 8 and 9 respectively therein. The outer face of each head has a boss or projection 10 formed thereon and an exteriorly threaded nipple 11 projecting from said boss and axially centered with relation to the head. The bosses 10 are preferably of polygonal form for the convenient application of a wrench thereto.

The ports 8 and 9 at one of their ends extend axially of the heads and open through the threaded nipples 11. The other ends of these ports open upon the opposite or inner faces of the heads adjacent to their peripheries. The opposed ends of the sections of the fuel supply pipe 5 are adapted to be connected to the nipples 11 of the respective heads by means of suitable coupling members 12.

The head 6 is provided, upon its inner face, with an axial extension 13, which is bored as at 14 to receive a rod 15 which projects from the inner face of the other head 7. This rod at its point of connection to the head 7 is diametrically enlarged as at 16, the diameter of said enlargement being substantially equal to the exterior diameter of the extension 13 on the head 6. The end of the rod 15 is threaded, as at 17, for engagement with the threads 18 formed on the wall of the bore 14 at its inner end.

The permutation valve elements which are adapted to be assembled between the spaced heads 6 and 7 are in the form of annular disks 19. In the present instance I have shown five such disks, though a greater or less number might be employed as desired. Each of these disks is provided with a transverse opening 20 therein of a diameter equal to the diameter of the ports 8 and 9 extending through said heads. As shown, four of the disks 19 are mounted for rotation relative to each other upon the extension 13 on the head 6 while the remaining disk is rotatably mounted upon the enlarged end portion 16 of the rod 15.

Each of the permutation disks 19, as well as the heads 6 and 7, is provided upon its peripheral face with spaced annular knurled ribs or flanges 21. Between these flanges on the disks 19 the numerals or digits 22 are stamped or otherwise delineated on the peripheral faces of the disks and disposed in circumferentially spaced relation to each other, each disk being thus provided with the digits 0 to 9. Upon the peripheral faces of the heads 6 and 7, the longitudinally aligned index marks 23 are provided.

For the purpose of yieldingly holding the several permutation disks against casual relative rotation, spring-pressed pins 24 are mounted in the extension 13 on the head 6 and in the enlargement 16 of the rod 15. These pins are yieldingly forced or projected outwardly and into the spaced notches or seats 25 formed in the inner peripheral faces of the disks 19. The seats 25 and the ends of the pins 24 are rounded so that upon the application of a positive circumferential or turning pressure on the disks, the pins 24 will be forced out of the seats 25 so as to permit of such relative rotation of the disks.

In assembling the several parts of the valve, the four disks are arranged upon the extension 13 of the head 6 and the single disk upon the enlarged portion 16 of the rod 15 which is carried by the head 7. The rod 15 is then inserted into the bore of the extension 13. The boss 10 on the head 6 is securely gripped in a vise or by other holding means and a wrench is applied to the boss on the head 7. This head is turned until the end face of the enlargement 16 on the rod 14 is brought into tight frictional bearing contact against the end of the extension 13. The two heads are thus securely connected to each other and held against being turned, merely by the use of the hands so that they might be disconnected. The stem 13 against which the enlargement 16 abuts acts as a stop to prevent such frictional pressure of the permutation disks against each other as would render it difficult to turn said disks.

When the several disks 19 are turned to certain definite positions, the openings 20 thereof are in alignment with each other and also with the angular ports 8 and 9 in the heads 6 and 7, thus permitting of the free passage or flow of the gasoline through the connected ports and openings to the carburetor. As shown in Fig. 2 of the drawings, the combination of digits on the disks, whereby the valve may thus be opened, in the present instance reads from left to right 19210. When these numerals on the respective disks are arranged in alignment with each other and with the index marks 23 on the heads 6 and 7, then the openings 20 in said disks are in registering relation and in alignment with the ports 8 and 9 in the relatively stationary heads between which said disks are mounted. Upon imparting a relative rotation to the disks, the combination is broken up and the openings 20 are disaligned so that the passage of the fuel from the inlet port 8 in the head 6 to the outlet port 9 in the head 7 is prevented. The connecting means between the spaced heads being entirely covered and hidden from view by the permutation disks, it cannot be easily understood how said heads are connected so that the purpose of the device could not be frustrated by one not in possession of the secret combination. It will thus be seen that by means of the present invention, the owner of the motor vehicle may lock the supply connection between the gasoline tank and the carburetor so as to prevent the theft of the vehicle or its use by unauthorized persons.

From the foregoing description considered in connection with the accompanying drawings, the construction, manner of operation and several advantages of the improved permutation valve will be readily understood. I have herein referred to the device as being particularly designed for use in connection with the fuel supply conduit for motor vehicle engines. It is obvious, however, that such a valve might also be advantageously employed for various other purposes. Furthermore, it will be manifest that in the practical development of the invention and in its adaptation to other uses, numerous mechanical alterations may be found advisable. It is accordingly to be understood that while I have herein disclosed one practical construction and arrangement of the several elements, the device is nevertheless susceptible to embodiment in many other alternative forms and I therefore reserve the privilege of adopting all such legitimate changes as may be fairly incorporated within the spirit and scope of the invention as claimed.

I claim:

1. A permutation valve comprising heads having ports connected in a fluid line, tumblers also having ports rotatably mounted between the heads, said heads having interfitting means extending through the tumblers for securing the heads together about the tumblers and for rotatably supporting the tumblers, said means being rigid with the inner portions of the heads.

2. A permutation valve comprising disks having ports therein adapted to be connected in a fluid line, said disks having rigid therewith and projecting therefrom telescoping means adapted to connect the disks in spaced relation, said telescoping means extending substantially axially from the heads, and disks movably mounted upon the means between the heads and having ports adapted in one position of the disks to register with the ports in the heads.

3. A permutation valve comprising ported heads adapted to be connected in a fluid line, means extending between the heads and rigid therewith for connecting the same substantially axially in spaced relation and having interlocking connection to avoid the heads being moved axially apart, rotary disks on said means between the heads having ports adapted to register with the ports in the heads, and means located between the disks and said means for yieldably holding said disks against accidental turning.

4. A permutation valve comprising ported heads adapted to be connected in a fluid line, a hollow extension rigidly mounted on one head, a rod rigidly mounted on the other head and adapted to project through the extension and having removable interlocking engagement therewith, and ported disks rotatably mounted on the extension.

5. A permutation valve comprising ported heads, a hollow extension extending substantially axially from one head, a rod extending from the other head and adapted to fit within the hollow extension, said rod having a boss thereon adapted to abut against the end of the extension, and a series of ported tumblers rotatably mounted upon the extension and boss.

6. A permutation valve comprising opposed heads having offset ports therein extending outwardly substantially axially for connection in a fluid line and inwardly near the peripheries thereof, a number of rotary disks assembled between said heads and also having ports near their peripheries adapted to aline with the inner portions of the head ports, interfitting connections between the heads forming supports for the tumblers and acting to both space the hears apart and secure them against separation, and internal inaccessible means for normally holding the tumblers in adjusted position and against axial rotation.

In testimony that I claim the foregoing as my invention, I have signed my name.

PHILIP PROBSTEL.